United States Patent [19]

Horvei

[11] Patent Number: 5,413,310
[45] Date of Patent: May 9, 1995

[54] VALVE ARRANGEMENT

[75] Inventor: Knut V. Horvei, Sandnes, Norway

[73] Assignee: Den Norske Stats Oljeselskap A.S, Stavanger, Norway

[21] Appl. No.: 175,379

[22] PCT Filed: Jul. 10, 1992

[86] PCT No.: PCT/NO92/00119
§ 371 Date: Jan. 11, 1994
§ 102(e) Date: Jan. 11, 1994

[87] PCT Pub. No.: WO93/01432
PCT Pub. Date: Jan. 21, 1993

[30] Foreign Application Priority Data

Jul. 12, 1991 [NO] Norway .................. 912762
Jul. 12, 1991 [NO] Norway .................. 912763

[51] Int. Cl.⁶ .............................. F16K 5/06
[52] U.S. Cl. ........................ 251/159; 251/94; 251/172
[58] Field of Search ............ 251/94, 159, 160, 172

[56] References Cited

U.S. PATENT DOCUMENTS

| | | | |
|---|---|---|---|
| 3,350,055 | 10/1967 | Campbell et al. | 251/94 X |
| 3,565,392 | 2/1971 | Bryant et al. | 251/159 |
| 4,575,045 | 3/1986 | Martin et al. | 251/172 |
| 5,247,964 | 7/1993 | De Lange | 251/159 X |

FOREIGN PATENT DOCUMENTS

| | | |
|---|---|---|
| 3007284 | 9/1981 | Germany. |
| 3208908 | 8/1983 | Germany. |
| 3208907 | 9/1983 | Germany. |
| 159681 | 1/1989 | Norway. |
| WO91/19921 | 12/1991 | WIPO. |

*Primary Examiner*—John C. Fox
*Attorney, Agent, or Firm*—Foley & Lardner

[57] ABSTRACT

Valve, in particular large ball valve for use in oil and gas installations, of the kind comprising a valve member (2) having a through flow passage (6), a movable seat or seal holder (8, 9) and means (11, 12) for moving the holder in directions towards and from cooperating parts (21, 22) of the valve member. At least one opening from the flow passage (6) is surrounded by a protruding edge portion (20) provided with an annular sealing surface (21). A front portion (17) of the seat or seal holder (8, 9) also has an annular sealing surface (18) adapted to cooperate with the sealing surface (21) on the valve member (21) in the open position thereof (FIG. 1B). Outwardly of its sealing surface (18) the front portion (17) has a seal member (19) adapted to cooperate with a second sealing surface (22) on the valve member (2) in the closed position thereof (FIG. 1A).

11 Claims, 7 Drawing Sheets

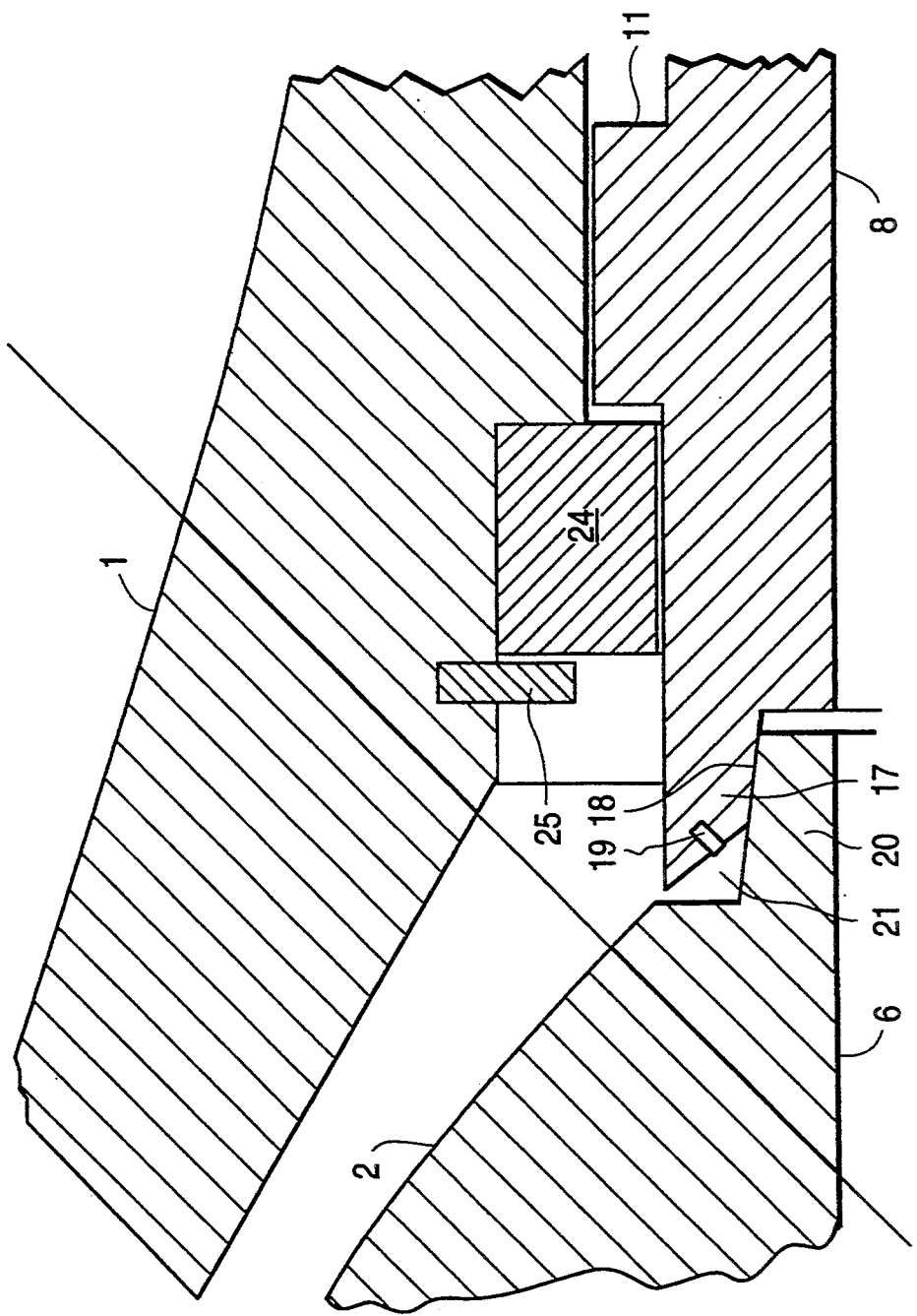

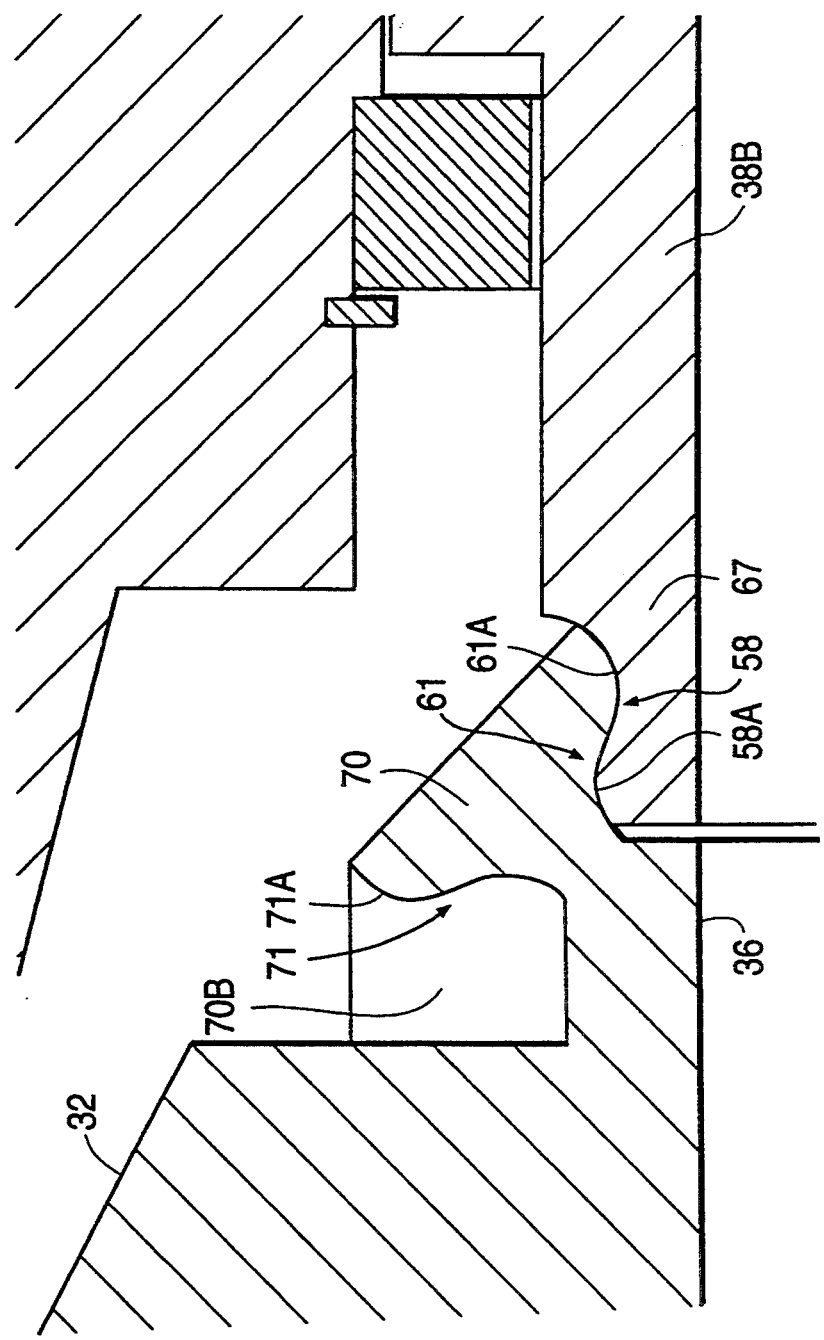

VALVE ARRANGEMENT

BACKGROUND OF THE INVENTION

This invention relates to a valve, in particular a large ball valve for use in oil and gas installations for offshore production. Valves of actual interest here are valves of the kind comprising a movable valve member with a through flow passage, a movable seat or seal holder and means for moving the holder in direction towards and from cooperating parts of the valve member.

SUMMARY OF THE INVENTION

The invention can be regarded as a further development or modification of a valve design being proposed in International Patent Application, Publication No. WO 91/19921. Reference is also made to Norwegian Patent No. 159,681 which shows a valve structure having in principle some resemblance with the valve according to the patent application just mentioned above. The present invention is directed to improving certain functions in such valves, including the protection and securing of vital parts in the valve structures against wear and corrosion, which can be caused by, inter alia, the media with which the valves shall operate.

Closer statements of the valve according to the invention as well as the novel and specific features thereof, are found in the claims.

Substantial advantages being attained by use of the invention consist in a good protection of the sealing elements in the valve. This protective effect has particular interest in relation to all media and contaminants which can flow through the valve in its open position.

BRIEF DESCRIPTION OF THE DRAWINGS

In the following description the invention shall be more closely explained with reference to drawings, which by way of examples illustrate various valve embodiments according to the invention in the form of a ball valve. As will appear from the following description it is obvious that the invention is not limited to ball valves, but can also be employed in other types of valves, for example gate valves.

In the drawings.

DESCRIPTION OF THE PREFERRED EMBODIMENTS

In FIGS. 1 and 2 of the drawings there is shown a valve housing 1 with a spherical valve member or ball 2 mounted therein, the valve ball having a central through flow passage 6.

Figure 1A:
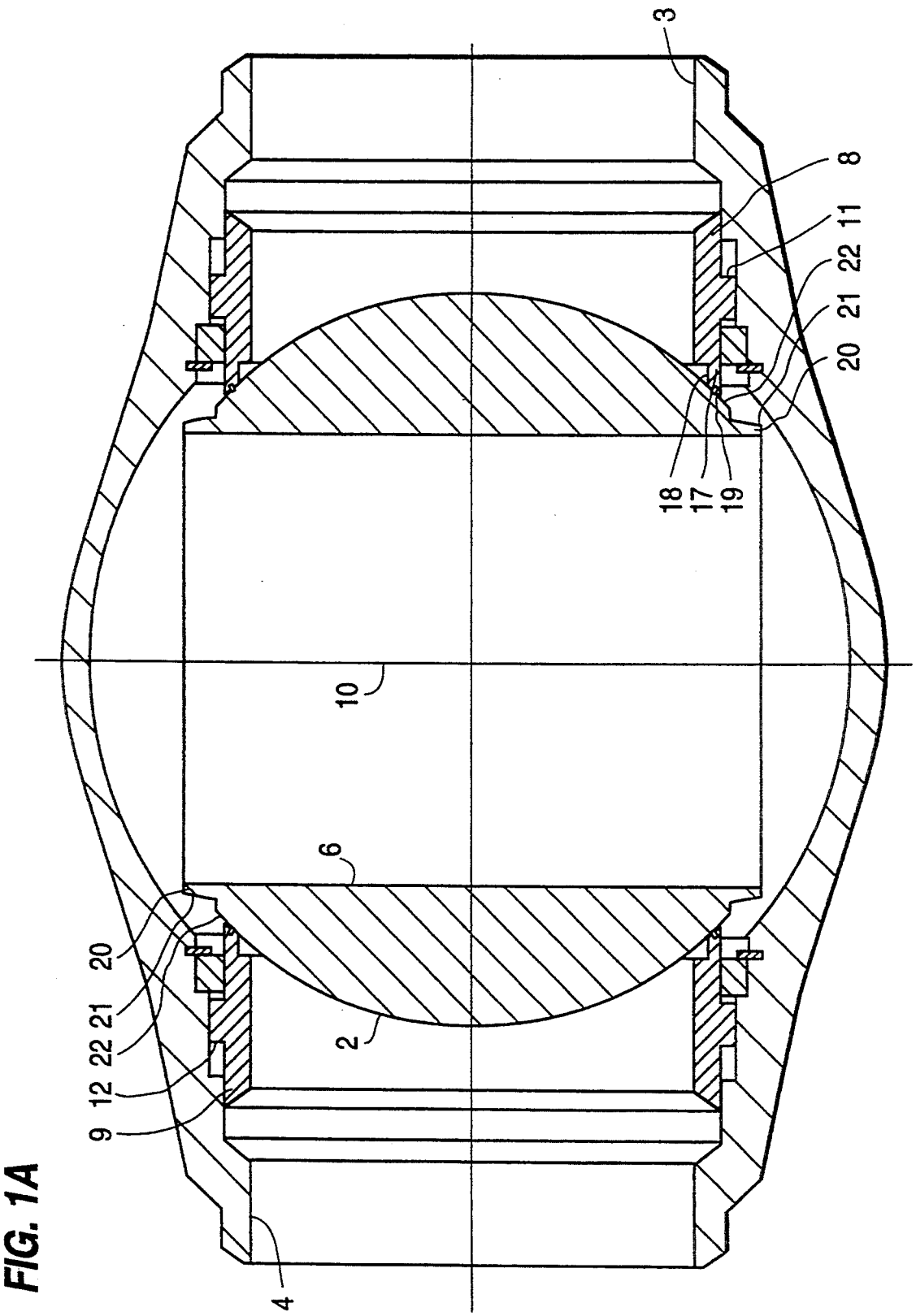
FIGS. 1A and 1B show axial sections through a ball valve in two different operative positions, FIG. 2 at an enlarged scale shows parts of the valve in FIG. 1 in open position (FIG. 1B)
Figure 1B:
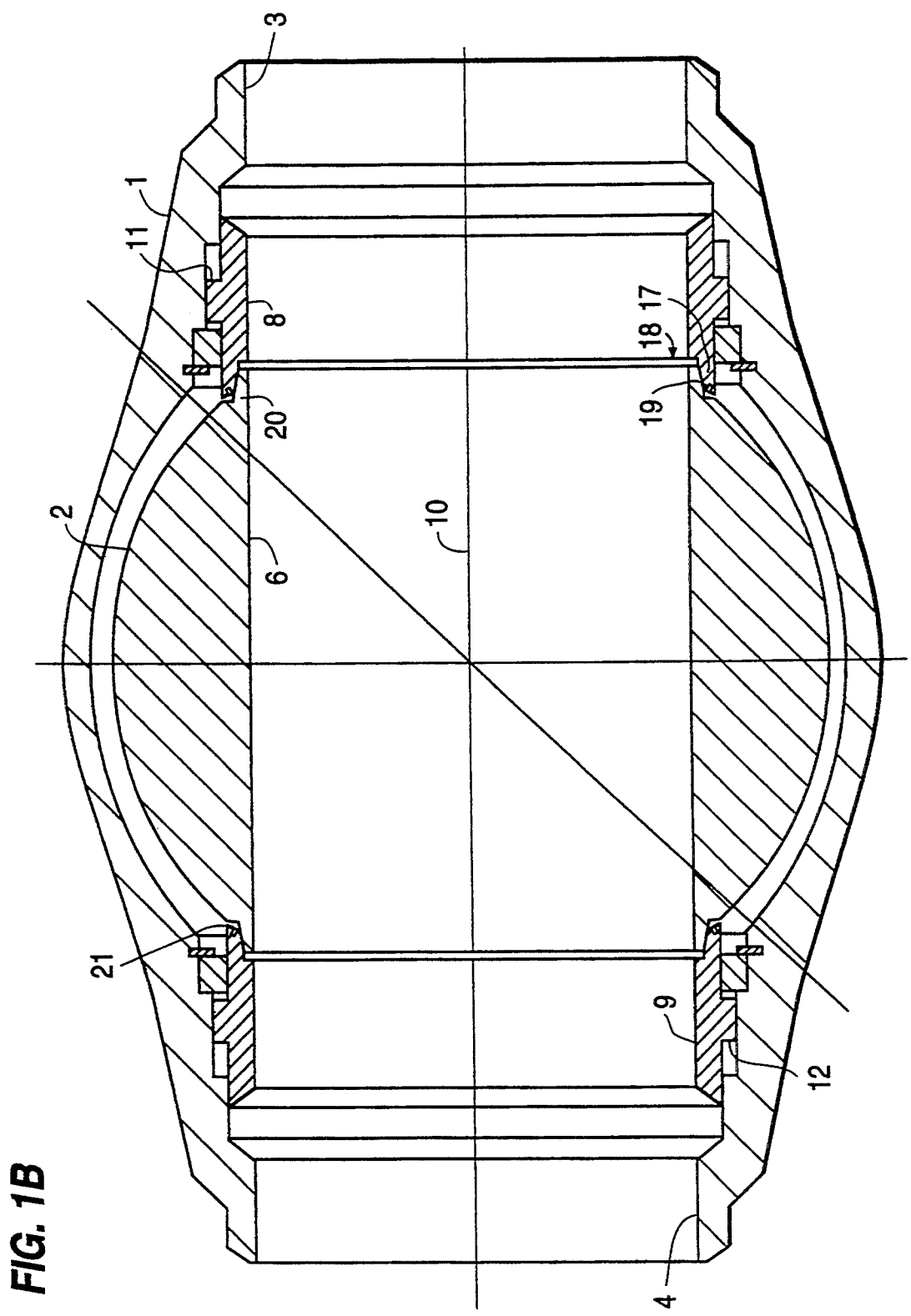

FIG. 1A shows the valve ball 2 in its closed position, i.e. with the axis 10 of the flow passage extending vertically in the figure. FIGS. 1B and 1BC show the valve in its open position, i.e. with the axis 10 horizontally. FIGS. 1A and 1B show seat or seal holders 8 and 9 respectively in retracted positions, whereas these holders are moved forward to positions cooperating with and sealing against the valve ball.

Thus, as in the case of the above mentioned, previously proposed designs, the holders 8 and 9 are adapted to be moved in a direction towards and away from the valve ball 2 respectively, which can take place for example by means of hydraulic pressure against piston areas 11 and 12 respectively on the two holders, as far as pressing of the holders against the valve ball is concerned. Corresponding opposite piston areas can serve for an opposed sliding movement. Conduits for supplying hydraulic pressure are not shown in the drawing. As in previously known structures there can also be provided springs for permanently exerting a press force on the seat or seal holders. The term seat or seal holders is employed here because these holders as the case may be can be formed without any actual seal or gasket elements, since such elements according to the circumstances can be mounted on cooperating surfaces or portions of the actual valve member, for example a valve ball as shown in the drawings.

In the open position as illustrated in particular in FIG. 1B, there is formed a continuous channel through the complete valve, namely between end pieces 3 and 4 at opposite ends of the valve housing 1, the actual flow passage 6 through the valve ball, and where the holders 8 and 9 have internal confining surfaces extanding generally flush with the remaining channel cross section, so that a flow of media of interest through the valve in open position can take place as much as possible unimpeded.

When considering first the valve in its open position, as shown in FIG. 1B, with a corresponding and more detailed and enlarged illustration in FIG. 2, it is seen that a protruding edge portion 20 extends around the opening of the flow passage 6 at the surface of the ball 2. The protruding portion 20 is provided with a sealing surface 21 facing radially outwards and being conical for cooperation with a corresponding conical, inwardly directed sealing surface 18 at a front portion 17 of the holder 8.

It will be realized that when the holder 8 is urged against the valve ball 2, there can be generated a very significant sealing pressure between the cooperating conical surfaces 18 and 21, so that the desired sealing effect will be obtained also under difficult conditions and with high pressures in the flowing media. In a preferred embodiment the cooperating conical surfaces establish sealing directly metal against metal. As an alternative soft sealing materials can be employed for the sealing. In this connection it is a great advantage to arrange for the holder to be self-locking in relation to the valve ball in this position, upon being urged against the ball with a given force, for example caused by the above mentioned hydraulic system. For the purpose of such a self-locking effect it is expedient to adapt the conicity, surface treatment and choice of materials in the sealing surfaces of the cooperating parts, so that a sufficient friction is obtained between the sealing surfaces 18 and 21. This means that an oppositely directed, for example hydraulic, force must be used in order to remove the sealing effect, i.e. by pulling the holder 2 (to the right in FIG. 2) away from the valve ball for example for the purpose of setting the ball to its closed position.

As regards the location of the conical sealing surface 21 in relation to the spherical surface of ball 2, it is very advantageous according to the invention that the surface 21 is so located that the spherical surface with an imaginary extension will intersect the sealing surface. This relationship is directly apparent from FIG. 2. Such a location will be optimal, inter alia in view of the required movement of the holder 8.

As further seen from FIG. 2, the holder 8 at its front portion 17 and radially outwardly of the sealing surface 18, is provided with a seal element 19. This is not in function in the open position of the valve, but on the contrary in this position is well protected against influence from media and contaminants which flow through the valve. Thus, in the embodiment shown here, the holder 8 could have been denoted seal holder in view of the gasket or seal element 19 which is mounted on the holder. In other embodiments, however, holder could be without any such seal element, and therefore will rather constitute a seat holder for cooperation with a gasket or the like on the valve member itself, for example a valve ball.

In the closed position, as shown in FIG. 1A seal element 19 on holder 9 has been brought into engagement with parts 22 of the ball surface in the region outside the protruding edge portion 20 of the valve ball, the sealing portion or surface 22 actually constituting an integral part of the ball-shape itself, but possibly can be subjected to a particular surface treatment in order to obtain a good sealing effect. In this closed position the protruding portion 20 with the sealing surface 21 will be protected against media which can be under pressure through the end piece 4 agains the ball surface.

The examplory embodiment of FIGS. 1 and 2 is shown relatively schematically and simplified, and may be modified in several ways within the framework of the invention. A detail which is seen from FIG. 2 relates to components for keeping the seat or seal holder 8 in place, namely a retainer ring 24 with an accompanying locking ring 15. In practice several other detail solutions can be contemplated at this point. As mentioned earlier it is no necessary prerequisite in this embodiement that the valve member has the form of a ball 2 as shown in th drawings, since quite corresponding functions and sealing surfaces or sealing portions can be provided on other types of valve members. Such different valve members do not necessarily have to be based on pure rotation about an axis for movement between an open position and a closed position. Essential, however, in connection with the invention are seat or seal holders which are movable in directions against and from the associated valve member for cooperation therewith and sealing in relation thereto.

Another embodiment of the invention based on a ball-shaped valve member is shown in variants in FIGS. 3A and 3B, 4, and 5, whereby certain basic features in these figures or drawings are the same as in the embodiment of FIGS. 1 and 2.

In FIGS. 3A and 3B, 4, and 5 of the drawings there is shown a valve housing 31 with a ball-shaped valve member 32 mounted therein, the valve member having a central through flow passage 36.

Figure 3A:
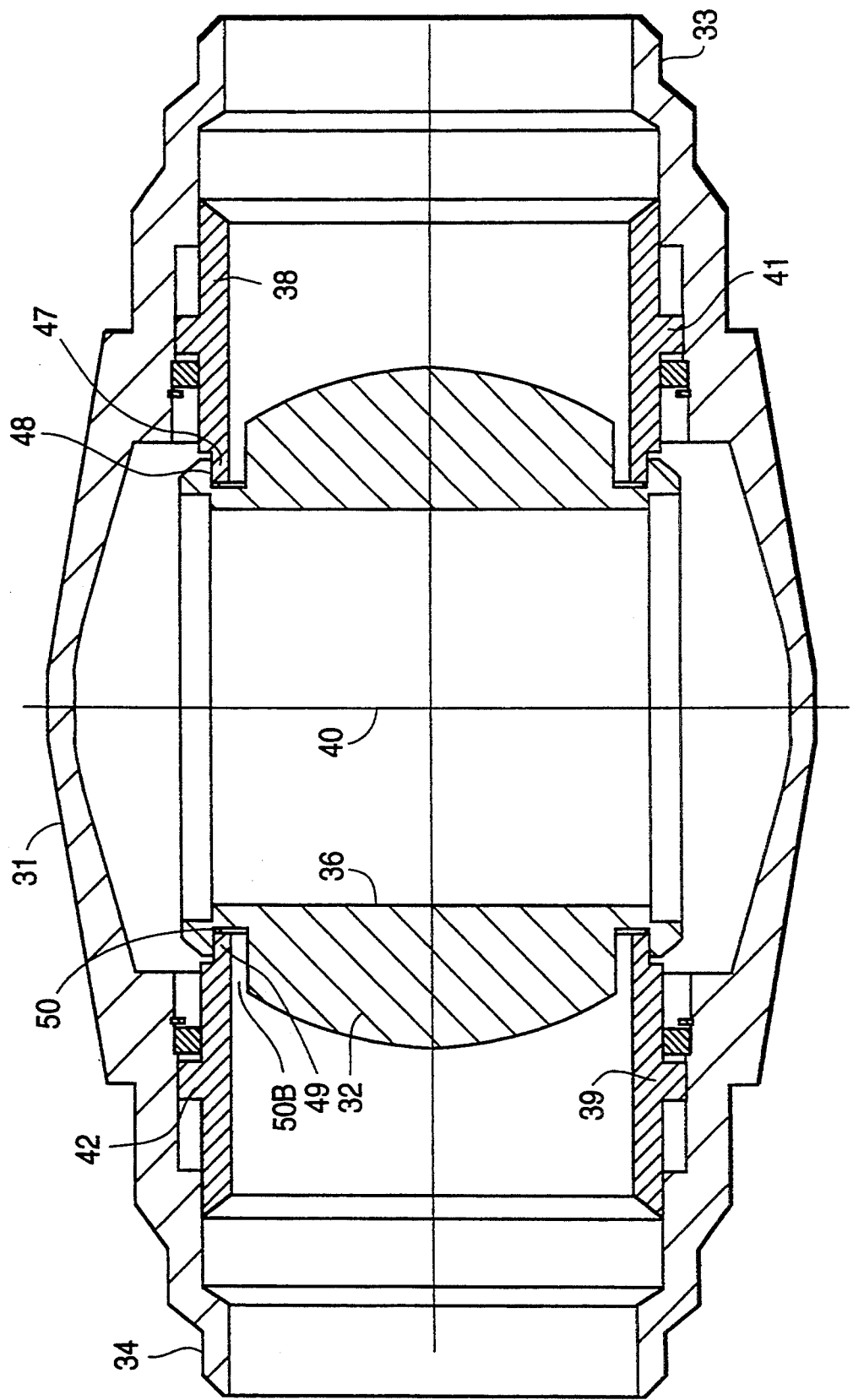
FIGS. 3A and 3B show axial sections through a second embodiment of the ball valve in two different operative positions, FIG. 4 at an enlarged scale shows parts of the valve in FIG. 3 in open position (FIG. 3B) in a somewhat modified embodiment, and FIG. 5 also shows an enlarged section as in FIG. 4, but of a second modified embodiment.
Figure 3B:
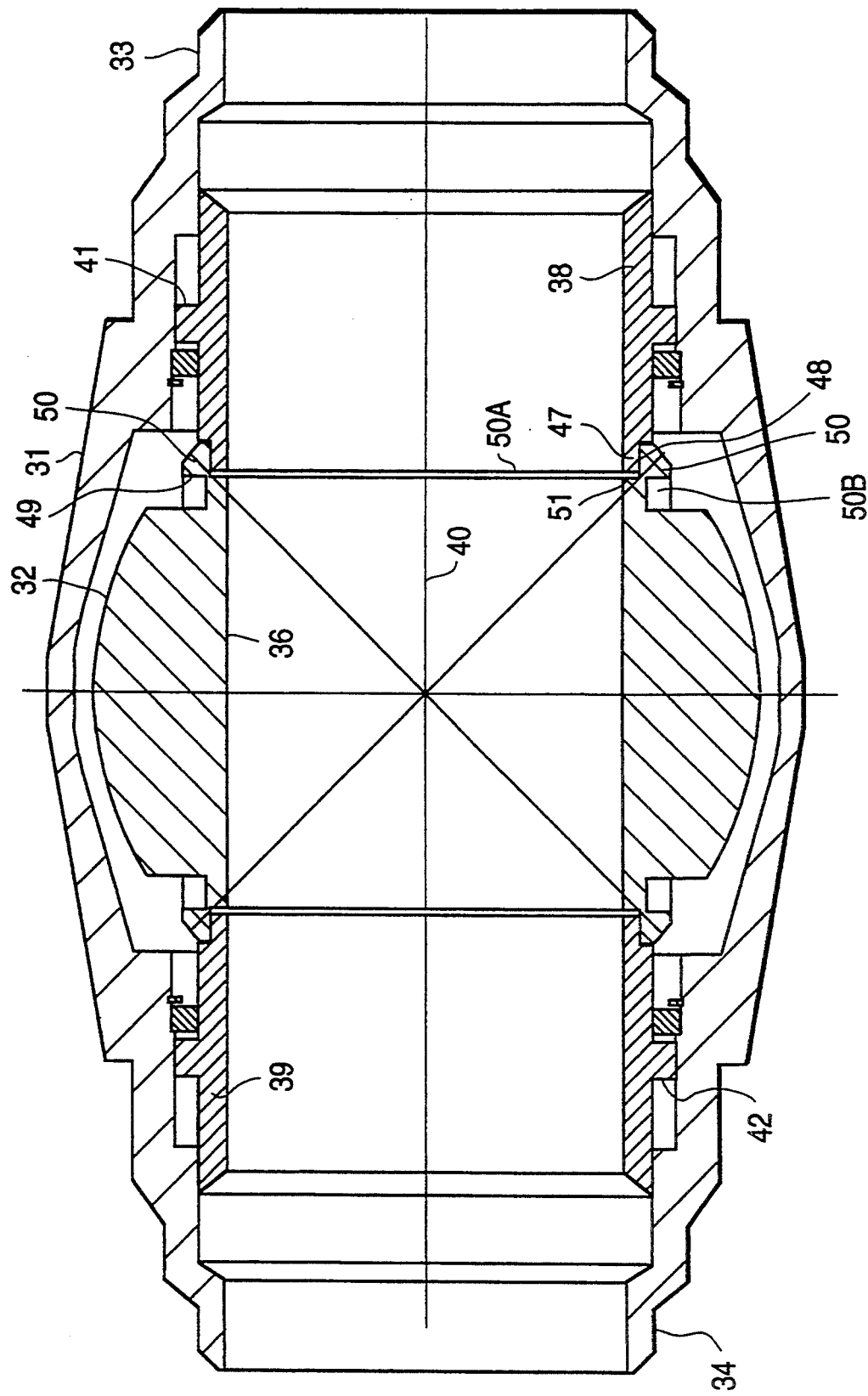

FIG. 3A shows the valve ball 32 in the closed position, i.e. with the axis 40 of the flow passage being vertical in the figure. FIGS. 3B shows the valve in open position, i.e. with axis 40 horizontal. FIG. 3C shows seat or seal holders 38 and 39 in FIGS. 3A and 3B is moved forward to cooperating and sealing positions against the valve ball 32.

Similar to the embodiment discussed above, FIG. 3 shows that the holders 38 and 39 are adapted to be moved in a direction towards and from the valve ball 32 respectively. Thus the holders have piston areas 41 and 42 respectively.

Considering first the valve in its open position as shown in FIG. 3B, it appears that a protruding edge portion 50 is provided around the opening of the flow passage 36 at the surface of the ball 32. The protruding portion 50 is formed with a sealing surface 51 which faces radially inwards and is conical for cooperation with a correspondingly conical and outwardly directed sealing surface 48 at a front portion 47 of holder 38.

It will be understood that when holder 38 is urged against the valve ball 32, it will be possible to establish a very significant sealing pressure between the cooperating conical surfaces 48 and 51 (FIG. 3B), so that the desired sealing effect is obtained also under difficult conditions and with high pressures in the flowing media. It is arranged for the holder to be self locking with respect to the valve ball in this position, upon being urged against the ball with a given force. For the purpose of this self-locking effect the shape or conicity, surface treatment, and choice of materials of the sealing surfaces are so chosen that a sufficient friction or locking force between the surfaces 48 and 51 is obtained. This means that an oppositely directed, for example hydraulic, force must be employed in order to remove the sealing effect, i.e. by pulling holder 38 (to the right in FIG. 3B) away from valve ball 32 so as for example to move it to closed position.

As regards the location of the conical sealing surface 51 in relation to the spherical surface of ball 32, it is an advantage according to the invention that the surface 51 is lying just within the spherical surface, as will be seen from the drawings. Such a location will be optimal, inter alia in view of the required movement of holder 38.

More particularly it appears from the drawings that the outer surface of the protruding portion 50 at least approximately constitutes a continuation of the spherical surface generally defining the valve ball 32. At both sides of the protrusion 50 the arrangement shown can be considered to comprise two grooves or recesses, i.e. the recess or edge portion 50A which forms the above mentioned sealing surface 51 and the more pronounced groove SOB, which has its function in the closed position of the valve, as shown in FIG. 3A. Thus, in this closed position the front portion of holder 39 has been introduced into groove 50B for tight engagement with the sealing surface 49 in the groove. Sealing in this position is obtained in a manner corresponding completely to what is shown and explained above in connection with the open position of the valve in FIG. 3B. In the embodiments shown the conical seal member 48 of holders 38 and 39 faces outwardly, with corresponding inwardly facing sealing surfaces 49 and 51 on valve ball 32. It will be realized that the relationship could have been the opposite with respect to this mutual orientation of the cooperating sealing surfaces and portions. Moveover these can be provided with a separate gasket element, either on the holders or on the valve ball.

Figure 4:
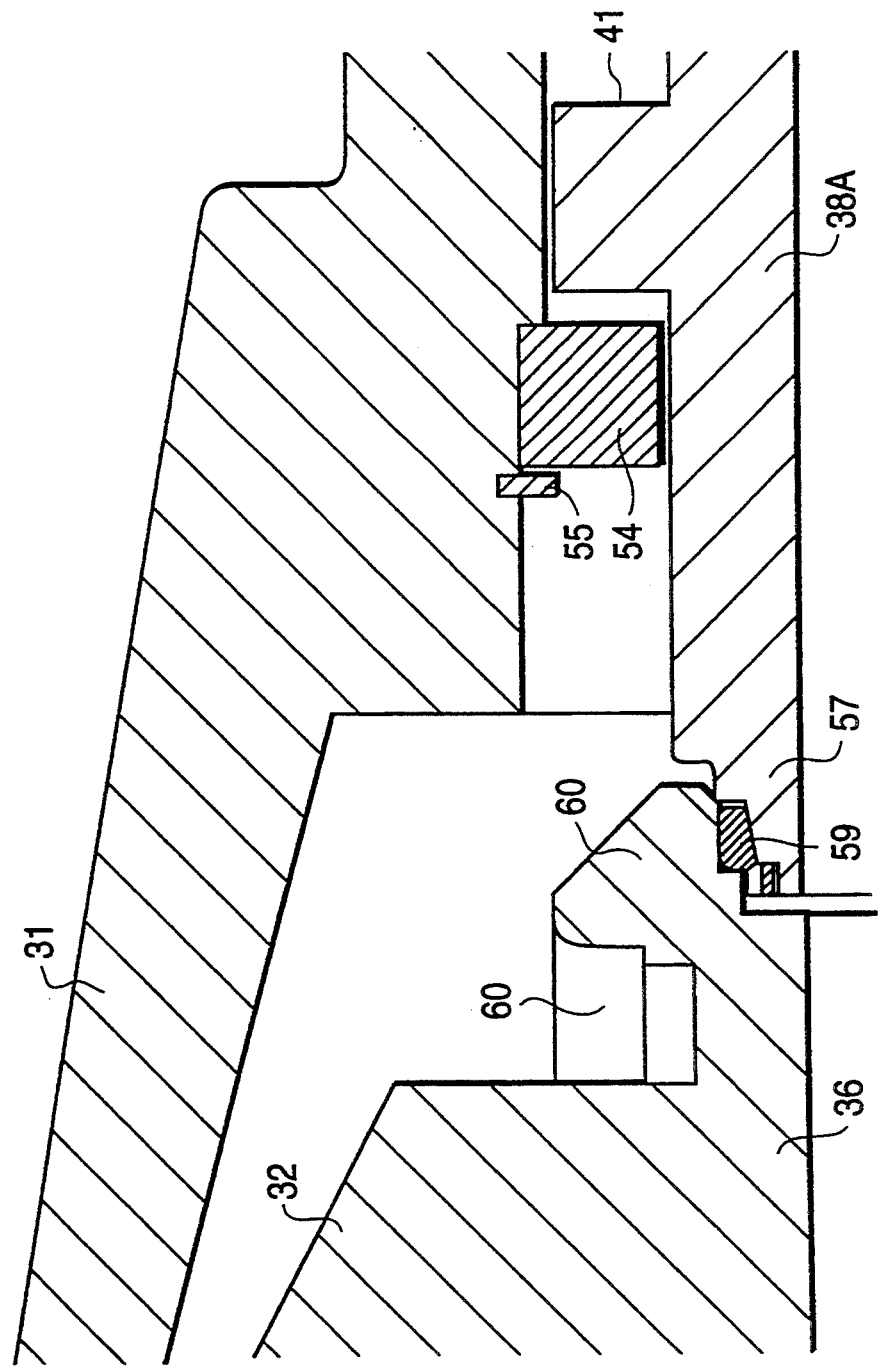

FIG. 4 shows a modified embodiment in which a holder 38A at its front portion 57 is provided with a gasket element 59 for sealing against a cooperating sealing surface at a protruding edge portion 60 of the valve ball, the latter edge portion corresponding generally to the protruding portion 50 in the embodiment of FIGS. 3A and 3B. Because of gasket element 59, however, the recess at one side of edge portion 60 and the groove 60B at the other side thereof are formed with a stepped sealing surface in view of the cooperation with gasket element 59.

Moreover in FIG. 4 there is shown a detail with respect to the mounting of holder 38A in valve housing 31, namely by means of a retainer ring 54 and a locking ring 55. Besides as regards the embodiment in FIG. 4 it would be correct to refer to a seal holder 38A because of gasket element 59.

In both the above described embodiments (FIGS. 3A, 3B and FIG. 4) there will be obtained an improved sealing effect by increasing the hydraulic pressure against areas 41 and 42 of the piston-like parts in holders 38 and 39, in the open position and the closed position respectively of the valve. In all embodiments where the front portion of the holders have sealing surfaces facing radially outwards, a high pressure in the media influencing the valve, will bring about a certain elastic expansion radially outwards of the front portion of the holders, which also contributes to a stronger compression of the sealing surfaces, so that a better sealing effect will be the result.

As also seen from FIGS. 3A and 3B with respect to closed position and open position respectively of the valve, the sealing surfaces being not in function in the valve position concerned will find themselves blocked from the media in pipelines connected to the valve, so that the sealing parts or surfaces being at the moment inactive will not be contaminated or subjected to other unfavourable influences from the media.

In the particular modification illustrated in FIG. 5 of the drawings, the complementary sealing surfaces in connection with the protruding edge portion 70 have a double curvature shape. The holder 38B here has a front portion 67 with a sealing surface 58 the contour of which in axial section has an approximate or partial S-shape, with a somewhat larger outer diameter or "height" at its forward part 58A. The cooperating sealing surface 61 on protrusion 70 in principle has a complementary shape with a bulge 61A adapted to enter into a corresponding depression in the sealing part 58 of holder 38B. Such shapes imply that the cooperating parts must undergo a certain elastic deformation when pressed together to the position shown in FIG. 5. Quite in anology the groove 70B at the other side of the protrusion 70 has a sealing surface 71 with a higher bulge 71A. The function and sealing effect will then be quite similar in the closed position of the valve.

I claim:

1. A Valve for use in oil and gas installations for offshore production, comprising: a movable valve member (2,32) having a through flow passage (6,36); at least one seat or seal holder (8,9,38,39); means (11,12,41,42) for moving said seat or seal holder in directions towards and from cooperating parts (21,22,50,60,70,) of said valve member (2,32);
   a partially conical first annular sealing surface (21,61,61A) formed by an edge portion surrounding at least one opening of said through flow passage (6,36);
   a front portion (17,57,67) of said seat or seal holder (8,9,38,39) being formed with an annular holder sealing surface (18,58,59) adapted to cooperate with said first annular sealing surface (21,61,61A) when said valve member (2,32) is in an open position, and further adapted to cooperate with a second sealing surface (22,50B,71) on said valve member (2,32) when said valve member is in a closed position;
   wherein the shape, conicity, choice of materials, and surface treatment of said first annular sealing surface and said annular holding sealing surface are adapted to give a sufficient degree of friction therebetween for said seat or seal holder (8,9,38,39) to be self-locking in relation to said valve member (2,32) upon being pressed against said valve member with a certain minimum force.

2. Valve according to claim 1, wherein said edge portion (20) is a protruding edge portion, said first annular sealing surface (21) is a surface facing generally radially outwards, said holder sealing surface (18) being a surface facing generally radially inwards, and an outside portion of said annular holder sealing surface (18) is provided with a seal member (19) for said cooperation with the second sealing surface (22).

3. Valve according to claim 2, where said valve is a ball valve, and said edge portion (20) of the valve member (2) is located such that an imaginary extension of a spherical surface of said valve member intersects said first annular sealing surface (21).

4. Valve according to claim 1, characterized in that said cooperating annular sealing surfaces (18,21) are cone surfaces having the same conicity and preferrably form a seal metal against metal without any additional seal elements.

5. Valve according to claim 2, characterized in that said seal member on the front portion (17) of said seat or seal holder, is a separate, annular gasket element (19).

6. Valve according to claim 2, characterized in that said second sealing surface (22) on said valve member (2) is provided with an annular gasket being adapted to the cooperating seal member on said seat or seal holder (8,9).

7. Valve according to claim 1 wherein, said valve member is a rotatable valve ball (32) having a plurality of said first annular sealing surfaces (49,51,61,71) facing generally radially inwards, and said seat or sealing holder is provided with a plurality of said annular holder sealing surfaces (48,59,58) facing generally radially outwards.

8. Valve according to claim 7, wherein a self-locking effect, based on mutually mating shapes, being established upon a temporary elastic deformation of at least one of an edge portion (70) of the valve ball and said front portion (67) of said seat or seal holder, when said valve ball and said holder are pressed together.

9. Valve according to claims 7, characterized in that said sealing surfaces (49,51,61,71) on the valve ball are located radially inwardly of the general spherical surface of said valve ball (32).

10. Valve according to claim 7, characterized in that said sealing surfaces (49,51,61,71) of the valve ball and said holder sealing surface (48) are cone surfaces having the same conicity and preferrably form a seal metal against metal without any additional gasket elements.

11. Valve according to claim 7, characterized in that said holder sealing surface comprises a gasket element (59).

* * * * *